Feb. 23, 1971 R. J. HALSTEAD 3,564,929

ADJUSTABLE MEANS FOR LIMITING ROTATION OF THE CONTROL SHAFT OF ELECTRIC CONTROL MEANS

Filed Sept. 2, 1969

INVENTOR.
RICHARD J. HALSTEAD

BY

HIS ATTORNEY

United States Patent Office 3,564,929
Patented Feb. 23, 1971

3,564,929
ADJUSTABLE MEANS FOR LIMITING ROTATION OF THE CONTROL SHAFT OF ELECTRIC CONTROL MEANS

Richard J. Halstead, Chesapeake, Va., assignor to General Electric Company, a corporation of New York Filed Sept. 2, 1969, Ser. No. 854,604
Int. Cl. F16h *35/18*
U.S. Cl. 74—10.2 12 Claims

ABSTRACT OF THE DISCLOSURE

A control shaft carries an abutment which contacts an adjustable abutment to limit the extent of rotation of the control shaft. The adjustable abutment is rotatably mounted on the control shaft, has ratchet means thereon, and is spring biased toward a mounting panel having a detent engaged with the ratchet means. The adjustable abutment can be manually urged away from the detent and rotatably reset to thereby change the extent of rotation of the control shaft.

BACKGROUND OF THE INVENTION

This invention relates to electric control means and, more particularly, to adjustable means for limiting rotation of the control shaft of rotary electric control means. The present invention is particularly adapted for use as an adjustable mechanical limiter for the rotary control shaft of the electric control means used to control the audio volume in a television or radio receiver that is intended for use in hospitals, hotels, motels and similar areas.

Hospitals, hotels, motels and other similar areas often require that television and radio receivers intended for use therein be provided with means for limiting the receiver audio volume in order that inmates and guests other than the viewer will not be offended by excessive audio volume from the receiver. The audio volume control means provided in a conventional or "general use" receiver usually comprises a rotary electric controller, such as a rotary resistor pot, having a rotatable control shaft. Frequently, this rotatable control shaft also serves as an "on-off" switch for the receiver, acting to switch the receiver "on" when rotated in the audio volume-increasing direction past the minimum volume level and acting to switch the receiver "off" when rotated in the opposite or volume-decreasing direction past the minimum volume level.

Heretofore, the audio volume limiting means that have been employed to adapt one of the aforedescribed "general use" receivers to a "special use" receiver intended for use in hospitals, hotels, motels and similar areas, have been of an electric nature and have frequently comprised an additional pot resistor wired in series with the conventional rotary control shaft operated pot resistor, with the additional resistor pot being adjustable only by means not readily available to the viewer, such as a screwdriver. While producing generally satisfactory results, these prior-art electric-type volume limiting means have added undesirably to the labor cost of the "special use" receiver in that they require rewiring of the conventional or "general use" receiver.

SUMMARY OF THE INVENTION

The present invention provides an attractive, lower-cost, mechanical alternative to the aforedescribed prior-art electric means which have heretofore been employed to limit the audio volume in a television or radio receiver that is intended for use in hospitals, hotels, motels and similar areas.

While the present invention provides simple, economical, mechanical means for adjustably limiting the rotation of any shaft, it is particularly adapted for use as an adjustable mechanical limiter for the rotary control shaft of the electric control means used to control the audio volume in a television or radio receiver that is intended for use in hospitals, hotels, motels and similar areas.

Basically, the present invention comprises a generally U-shaped mounting bracket, means for fastening the mounting bracket to an apertured base member with the legs of the U extending toward the base member, means for securing electrical control means having a rotatable control shaft to the mounting bracket with the control shaft extending through the base member aperture, stop means mountable on the control shaft for rotation therewith and axial movement relative thereto, and limiter means mountable on the control shaft for both axial and rotary movement relative thereto. The limiter means has first means, preferably comprising ratchet means, which can be engaged with second means, preferably comprising detent means, provided on the base member to prevent rotation of the limiter means in a first direction but to permit rotation of the limiter means in a second direction opposite the first direction. The limiter means also has stop-engaging means for engaging the stop means, and yieldable means are provided for yieldably urging axial movement of the limiter means relative to the control shaft to yieldably engage the first means with the second means.

With this arrangement, the position of the stop-engaging means can be angularly varied relative to the stop means, and the limit of rotation of the control shaft in the first direction can thus be adjusted, by first moving the limiter means axially relative to the control shaft against the urging of the yieldable means to disengage the first means from the second means, then rotating the first means relative to the second means and the control shaft, and, finally, releasing the limiter means to the urging of the yieldable means, whereupon rotation of the control shaft in the first direction will be stopped by engagement of the stop means with the stop-engaging means, but rotation of the control shaft in the second direction will not be stopped by engagement of the stop means with the stop-engaging means.

BRIEF DESCRIPTION OF THE DRAWING

The present invention is illustrated in the accompanying drawing, wherein.

DESCRIPTION OF THE PREFERRED EMBODIMENT

Figure 1:
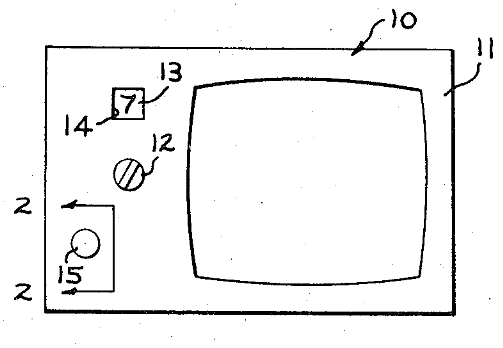
FIG. 1 is a front elevational view of a television receiver incorporating a presently preferred form of the present invention.

Referring now to the drawing and particularly to FIG. 1 thereof, there is illustrated a television receiver 10 having a generally rectangular box-like outer cabinet 11. The receiver 10 is provided with means by which the viewer can select the particular station or channel he wishes to view and also with means by which the viewer can adjust the audio volume level.

As shown in FIG. 1, the channel selector means and the audio volume control means are operated by the viewer from the front wall of the receiver cabinet 11. The channel selector means includes a rotary channel selector knob 12 and a channel indicator member 13, only a small portion of which is visible through an opening 14 provided in the front wall of the receiver cabinet 11.

The channel selector knob 12 and indicator member 13 are interconnected by well-known means whereby manual rotation of the channel selector knob 12 by the viewer results both in selection of the desired channel and also in movement of the indicator member 13 relative to the cabinet opening 14 so as to centrally align the correct indicator indicium for the selected channel within the cabinet wall opening 14. The audio volume control means, with which the present invention is particularly concerned, includes an audio volume control knob 15.

Figures 2, 3:
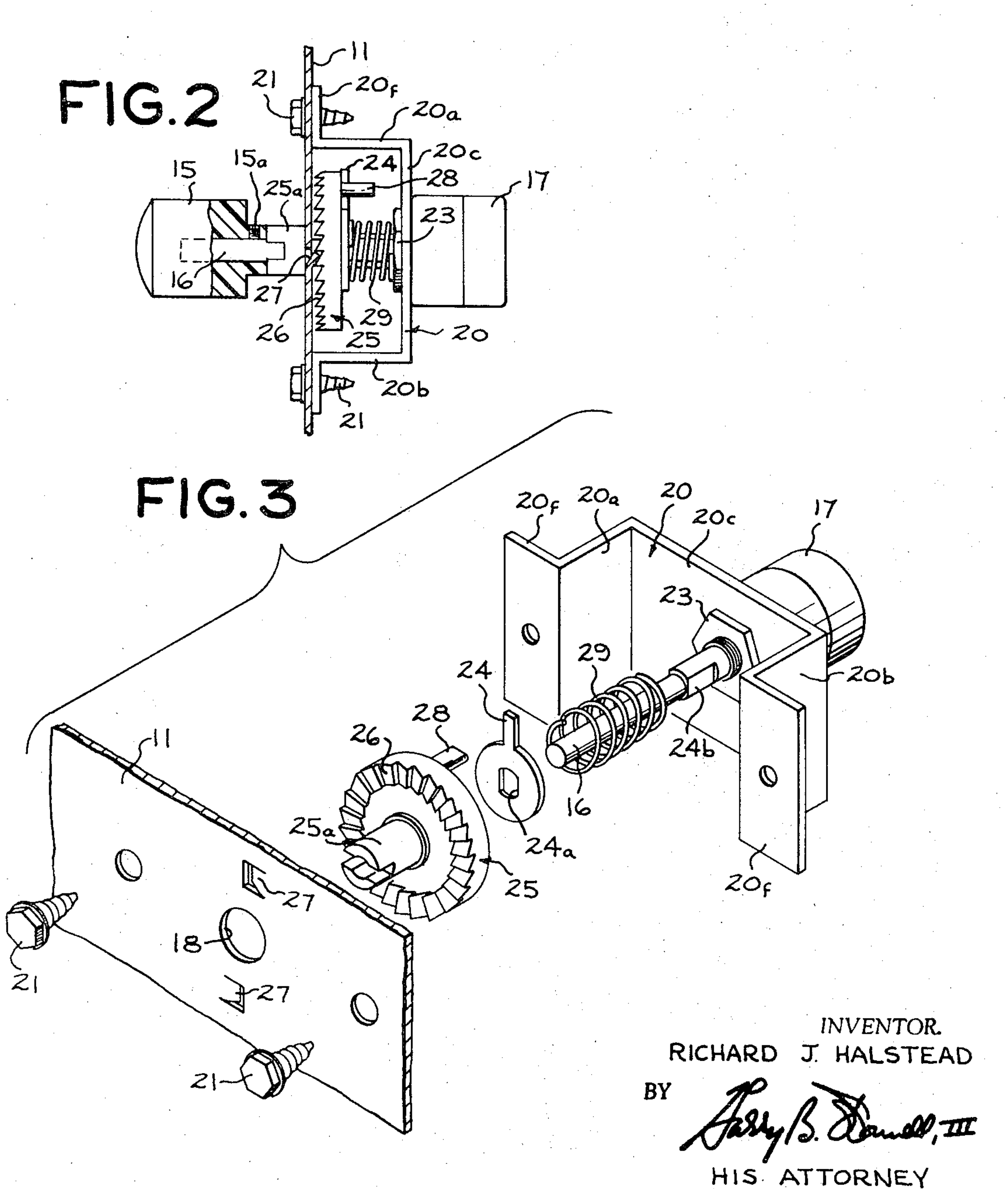
FIG. 2 is an enlarged fragmentary sectional view taken along line 2—2 of FIG. 1.
FIG. 3 is a further enlarged exploded view of the structure shown in FIG. 2.

As best shown in FIG. 2, the audio volume control knob 15 is detachably connected by suitable fastening means, such as a setscrew 15*a*, to the distal end of a rotatable control shaft 16 of a rotary electric control means 17. As illustrated in FIGS. 2 and 3, the distal end of the control shaft 16 of the audio volume control means 17 extends through an aperture 18 provided in the front wall of the receiver cabinet 11. The rotary electric control means 17 is a well-known variety and includes a pot resistor that is electrically connected in series with the audio amplifier circuitry of the receiver 10 in a well-known manner. As viewed in FIGS. 1 and 3, rotation of the control shaft 16 and its attached knob 15 in a first or clockwise direction is intended to increase the level of audio volume; whereas rotation of the control shaft 16 and knob 15 in a second direction opposite the first direction (counter-clockwise as viewed in FIGS. 1 and 3) is intended to decrease the level of the audio volume. As is frequently the case, the control means 17 is of a type wherein the rotatable control shaft 16 also serves as an "on-off" switch for the receiver 10, acting to switch the receiver "on" when rotated in the audio volume-increasing direction (clockwise as seen in FIGS. 1 and 3) past minimum audio volume level and acting to switch the receiver 10 "off" when rotated in the opposite or volume-decreasing direction (counter-clockwise as seen in FIGS. 1 and 3) past the minimum audio volume level.

The rotary electric control means 17 and its associated rotatable control shaft 16, which has a distal end that extends through the aperture 18 provided in the front wall of the receiver cabinet 11 for rotation by the control knob 15 that is detachably fastened on the control shaft distal end, is quite conventional and is typical of the combination audio volume and "on-off" control means frequently provided in a conventional or a "general use" television receiver.

As indicated above, the present invention is particularly concerned with providing novel mechanical means for adapting one of these "general use" receivers to be a "special use" receiver of the type intended for use in hospitals, hotels, motels and other similar areas, whereby the previous requirement of rewiring of the conventional receiver in order to perform such an adaptation can be eliminated and the labor cost involved can thus be substantially reduced.

As best shown in FIGS. 2 an 3, the present invention provides simple, economical, adjustable mechanical means for limiting the rotation of the rotatable control shaft 16 of the rotary electric control means 17. The present invention comprises a generally U-shaped mounting bracket 20; fastening means, such as sheet metal screws 21, for fastening the mounting bracket 20 to an apertured base member, such as the front wall of the receiver cabinet 11, with legs 20*a* and 20*b* of the U extending toward the base member 11; securing means, such as threaded nut 23 for securing the electrical control means 17 having the rotatable control shaft 16 to the mounting bracket 20 with the control shaft 16 extending through the base member aperture 18; stop means, such as lever member 24, mountable on the control shaft 16 for rotation therewith and axial movement relative thereto; and limiter means, such as axially bored limiter member 25, mountable on the control shaft 16 for both axial and rotary movement relative thereto. The limiter member 25 is preferably in the general form of inexpensive plastic disc having first and second major faces and includes first means, preferably in the form of ratchet means 26 carved on the first major face, which can be engaged with second means, preferably in the form of detent means 27 stamped in the base member or cabinet wall 11, to prevent rotation of the limiter means 25 in a first direction (clockwise as seen in FIGS. 1 and 3) but to permit rotation of the limiter means 25 in a second direction opposite the first direction (counter-clockwise as seen in FIGS. 1 and 3). The limiter means 25 also has stop-engaging means, preferably in the form of a stop-engaging pin 28 protruding from the second major face for engaging the stop means lever 24, and yieldable means, preferably in the form of a coil spring 29 surrounding the control shaft 16 between the bight portion 20*c* of the U-shaped mounting member 20 and the lever member 24, are provided for yieldably urging axial movement of the limiter means 25 relative to the control shaft 16 (to the left as seen in FIG. 2) to yieldably engage the first or ratchet means 26 with the second or detent means 27. In the particular form of the present invention shown in the drawing, the limiter member 25 is also provided with a hub-like portion 25*a* on its first major face which is extensible through the same aperture 18 in the base member or front wall of the receiver cabinet 11 through which the rotatable control shaft 16 extends.

With this arrangement, the position of the stop-engaging means or pin 28 can be angularly varied relative to the stop means or lever 24, and the limit of rotation of the control shaft 16 in the first direction (clockwise as seen in FIGS. 1 and 3) can thus be adjusted, by first moving the limiter means 25 axially relative to the control shaft 16 against the urging of the yieldable means or spring 30 (to the right as seen in FIG. 2) to disengage the first or ratchet means 26 from the second or detent means 27, then rotating the first means 26 relative to the second means 27 and the control shaft 16, and finally releasing the limiter means 25 to the urging (to the left as seen in FIG. 2) of the yieldable means or spring 29, whereupon rotation of the control shaft 16 in the first direction (clockwise as seen in FIGS. 1 and 3) will be stopped by engagement of the stop means or lever 24 with the stop-engaging means or pin 28, but rotation of the control shaft 16 in the second direction (counter-clockwise as seen in FIGS. 1 and 3) will not be stopped by engagmeent of the stop means 24 with the stop-engaging means 28.

In the presently preferred method of assembling the present invention, the rotary electric control means 17 is first secured to the bight portion 20*c* of the U-shaped mounting bracket 20 by the threaded nut 23, as shown in FIGS. 2 and 3, with the rotatable control shaft 16 extending in the same direction as the legs 20*a* and 20*b* of the U-shaped mounting bracket 20. Next, the yieldable means or coil spring 29 is slipped over the distal end of the control shaft 16. Then, the stop lever member 24, which, as illustrated in FIGS. 2 and 3, comprises a member that has a central opening 24*a* adapted to be keyed on a complementary surface 24*b* provided on the shaft 16, is slipped over the distal end of the shaft 16 and mounted thereon for rotation therewith and axial movement relative thereto. Next, the axially bored limiter member 25 is slipped over the distal end of the control shaft 16 with the stop-engaging means or pin 28 protruding toward the stop means or lever 24. Then, both the control shaft 16 and the hub-like portion 25*a* of the limiter member 25 are passed together through the aperture 18 in the base member or receiver cabinet front wall 11, and finally, the mounting bracket 20 is fastened to the base member or cabinet wall 11 by passing the fastening means or sheet metal screws 21 through the base member 11 and flanged portions 20*f* of the legs 20*a* and 20*b* of the mounting bracket 20.

Following the assembly procedure described above, the desired position of the limiter member 25 can then be set by grasping its portion 25*a* which extends through the base member aperture 18, depressing it (to the right as seen in FIG. 2) against the yieldable urging of the spring 29 to disengage the first or ratchet means 26 from the second or detent means 27, then rotating the portion 25*a* relative to the stop means or lever 24 and the control shaft 16, and finally releasing the portion 25*a* to return the limiter member 25 to the yieldable urging of the spring 29, which will then move the limiter member 25 axially relative to the control shaft 16 (to the left as seen in FIG. 2) to yieldably re-engage the first or ratchet means 26 with the second or detent means 27. Now, the rotary knob 15 is slipped on the distal end of the rotatable shaft 16 and attached thereto by the setscrew 15*a*. In the form of the invention illustrated, it is intended that the limit of rotation of the control shaft 16 in the first direction (clockwise as seen in FIGS. 1 and 3) shall not be re-set unless the knob 15 is removed to permit access to the hub portion 25*a* of the limiter means 25 and, therefore, the knob 15 is accordingly shaped to prevent one from gripping the extensible portion 25*a* of the limiter member 25 when the knob 15 is fastened on the distal end of the control shaft 16.

The mechanism of the present invention is "fail-safe," since, should the limiter means 25 be erroneously set, the first or ratchet means 26 on the limiter member 25 can be ratcheted past the second or detent means 27 on the base member 11 in the second direction (counter-clockwise as seen in FIGS. 1 and 3) by second-directional torsional forces applied to the control shaft 16 and transmitted to the limiter member 25 via engagement of the stop means or lever 24 with the stop-engaging means or pin 28 until the "off" position of the control means 17 is achieved.

As will be evident from the foregoing description, certain aspects of the present invention are not limited to the particular details of construction of the form illustrated, and it is contemplated that various other modifications or applications will occur to those skilled in the art. For example, the relative positions of the ratchet means 26 and detent means 27 might be reversed from that illustrated, e.g., with the ratchet means 26 being provided on the base member 11 and the detent means 27 being provided on the first major face of the limiter member 25. Furthermore, the portion 25*a* of the limiter means 25 which extends through the base member might extend through an additional opening, other than the aperture 18 through which the control shaft 16 extends. It is therefore intended that the appended claims shall cover such modifications and applications as do not depart from the true spirit and scope of the present invention.

What is claimed is:

1. Adjustable means for limiting rotation of the control shaft of electric control means, comprising:

(a) a mounting bracket;

(b) fastening means for fastening said mounting bracket to an apertured base member;

(c) securing means for securing electric control means having a rotatable control shaft to the mounting bracket with the control shaft extending through the base member aperture;

(d) stop means mounted on the control shaft for rotation therewith and axial movement relative thereto;

(e) limiter means mounted on the control shaft for both axial and rotary movement relative thereto, (1) said limiter means having first means engaged with second means provided on the base member to prevent rotation of said limiter means in a first direction but to permit rotation of said limiter means in a second direction opposite said first direction, and (2) said limiter means having stop-engaging means for engaging said stop means; and (f) yieldable means for yieldably urging axial movement of said limiter means relative to the control shaft to yieldably engage said first means with said second means, whereby the position of said stop-engaging means can be angularly varied relative to said stop means, and the limit of rotation of the control shaft in said first direction can thus be adjusted, by first moving said limiter means axially relative to the control shaft against said urging of said yieldable means to disengage said first means from said second means, then rotating said first means relative to said second means and the control shaft and, finally releasing said limiter means to said urging, whereupon rotation of the control shaft in said first direction will then be stopped by engagement of said stop means with said stop-engaging means but rotation of the control shaft in said second direction will not be stopped by engagement of said stop means with said stop-engaging means.

2. The invention of claim 1, wherein said limiter means has a portion extended through an opening in the base member.

3. The invention of claim 2, wherein said portion is extended through the base member aperture.

4. The invention of claim 1, wherein one of said first and second means comprises ratchet means and the other of said first and second means comprises detent means.

5. The invention of claim 1, wherein said first means comprises ratchet means and said second means comprises detent means.

6. The invention of claim 1, wherein said yieldable means comprises spring means.

7. The invention of claim 1, wherein said stop means comprises lever means keyed on the control shaft for rotation therewith and axial movement relative thereto.

8. The invention of claim 1, wherein:

(a) said limiter means comprises an axially bored member having first and second major faces with its bore slideably mounted on the control shaft, (b) said first means is located on said first major face of said bored member, and (c) said stop-engaging means is located on said second major face of said bored member.

9. The invention of claim 8, wherein said stop means comprises lever means keyed on the control shaft for rotation therewith and axial movement relative thereto.

10. The invention of claim 9, wherein said yieldable means comprises spring means.

11. The invention of claim 10, wherein one of said first and second means comprises ratchet means and the other of said first and second means comprises detent means.

12. The invention of claim 11, wherein said limiter means has a portion extended through an opening in the base member.

References Cited

UNITED STATES PATENTS

| | | | |
|---|---|---|---|
| 3,015,793 | 1/1962 | Fraser et al. | 74—10.2X |
| 3,505,884 | 4/1970 | Ford et al. | 74—10.2 |

MILTON KAUFMAN, Primary Examiner

U.S. Cl. X.R.

74—526